US006953198B2

(12) United States Patent
Onyszkiewicz et al.

(10) Patent No.: US 6,953,198 B2
(45) Date of Patent: Oct. 11, 2005

(54) SHORT PULL-BACK CHUCK

(75) Inventors: Edmund J. Onyszkiewicz, Shelby Township, MI (US); Frederick J. Pifko, Clinton Township, MI (US); Longine V. Morawski, Grosse Pointe Park, MI (US)

(73) Assignee: MP Tool & Engineering, Co., Roseville, MI (US)

( * ) Notice: Subject to any disclaimer, the term of this patent is extended or adjusted under 35 U.S.C. 154(b) by 83 days.

(21) Appl. No.: 10/674,542

(22) Filed: Sep. 30, 2003

(65) Prior Publication Data

US 2005/0067797 A1    Mar. 31, 2005

(51) Int. Cl.$^7$ .......................................... B23B 31/177
(52) U.S. Cl. ...................................... 279/141; 279/121
(58) Field of Search ............................ 279/60, 65, 121, 279/141, 74, 122

(56) References Cited

U.S. PATENT DOCUMENTS

| 1,412,170 A | | 4/1922 | Dixon |
| 1,711,769 A | | 5/1929 | Bell et al. |
| 3,188,102 A | | 6/1965 | Mott |
| 3,248,122 A | | 4/1966 | Roddy |
| 3,420,538 A | | 1/1969 | Benjamin et al. |
| 3,424,467 A | * | 1/1969 | Buck ..................... 279/2.13 |
| 3,610,645 A | | 10/1971 | Roddy |
| 3,618,961 A | | 11/1971 | Kiwalle |
| 3,633,929 A | | 1/1972 | Morawski |
| 3,707,292 A | | 12/1972 | Morawski et al. |
| 3,707,293 A | | 12/1972 | Morawski et al. |
| 3,707,294 A | | 12/1972 | Morawski et al. |
| 4,121,848 A | | 10/1978 | Morawski |
| 4,123,075 A | * | 10/1978 | Rosewarne et al. ......... 279/121 |
| 4,215,605 A | | 8/1980 | Toth et al. |
| 4,316,614 A | | 2/1982 | Clopton |
| 4,403,782 A | * | 9/1983 | Buck ......................... 279/121 |
| 4,558,876 A | * | 12/1985 | Call et al. .................. 279/127 |
| 4,570,949 A | | 2/1986 | Morawski et al. |
| 4,570,950 A | | 2/1986 | Morawski et al. |
| 4,602,797 A | * | 7/1986 | Morawski et al. ......... 279/2.11 |
| 4,616,538 A | | 10/1986 | Hessbruggen |
| 4,669,741 A | | 6/1987 | Rohm |
| 4,696,513 A | * | 9/1987 | Nobukawa et al. ......... 279/121 |
| 5,158,307 A | * | 10/1992 | Toyano et al. ............. 279/121 |
| 6,343,797 B1 | | 2/2002 | Tajnafoi et al. |
| 6,394,467 B1 | * | 5/2002 | Oki et al. ................... 279/106 |
| 6,409,182 B1 | | 6/2002 | Taglang |
| 2004/0140629 A1 | * | 7/2004 | Onyszkiewicz et al. .... 279/141 |
| 2004/0169342 A1 | * | 9/2004 | Nishimiya et al. .......... 279/121 |

FOREIGN PATENT DOCUMENTS

| JP | 6-328307 | 11/1994 |
| JP | 9-76106 | 3/1997 |

* cited by examiner

*Primary Examiner*—Derris H. Banks
*Assistant Examiner*—Michael W. Talbot
(74) *Attorney, Agent, or Firm*—Dickinson Wright PLLC

(57) ABSTRACT

The present invention relates to a chuck for gripping workpieces having an outer chuck body rotatable about a chuck axis and defining a cavity. The chuck includes a collar, coupled to the outer chuck body, having a slot with a slot axis angled relative to said chuck axis. An inner chuck body located within the cavity is movable along the chuck axis relative to the collar and the outer chuck body. The inner chuck body includes a bore having a bore axis angled relative to said chuck axis into which the jaw rod is disposed, with the jaw rod being coupled to the collar.

19 Claims, 3 Drawing Sheets

SHORT PULL-BACK CHUCK

BACKGROUND OF THE INVENTION

The present invention relates to a chuck for gripping workpieces and, more particularly, to a chuck having limited pull-back when gripping workpieces thereby, reducing forces that tend to distort the workpiece.

Draw-down chucks are widely used to grip workpieces while machining or performing other operations. Draw-down chucks come in a variety of sizes to grip various sized workpieces and typically have two to four jaws that move axially between an extended and a retracted position. To extend or retract the jaws, a puller coupled to the jaw rod moves the jaws axially to grip or release the outer or inner surface of a workpiece. Generally the body of the chuck includes bores through which the jaw rods extend. As the puller moves the jaw rods between the extended and retracted positions, the jaws rods are moved within the bores in the stationary chuck body. It is difficult to grip some workpieces with conventional chucks in a consistent and reliable manner without distorting the workpiece. For example, if the puller is retracted too far, the jaw rods engage against the outer radial surface of the workpiece and may exert too much force, thereby distorting the workpiece. Distortion may also occur from the retaining force of the engaged jaws during the machining process. Some manufacturers use elaborate methods to limit the amount of force exerted by the jaw rods or the location of the puller, but it is still difficult to consistently grip a workpiece with a limited force or limited movement of the jaw rods.

SUMMARY OF THE INVENTION

The present invention relates to a chuck for gripping workpieces having an outer chuck body rotatable about a chuck axis and defining a cavity. A collar including a slot with a slot axis angled relative to the chuck axis is coupled to the outer chuck body. An inner chuck body located within the cavity is movable along the chuck axis relative to the collar and the outer chuck body. The inner chuck body includes a bore having a bore axis angled relative to the chuck axis into which a jaw rod disposed. The jaw rod is coupled to the collar.

In an alternative embodiment, the chuck is coupled to a workpiece with jaws. The chuck includes an outer body having a cavity and a chuck axis; an inner body having at least two bores each having a bore axis angled relative each other, wherein the inner body is movable between an extended inner body position and a retracted inner body position along the chuck axis and within the cavity; a collar positioned between the outer body and the inner body, wherein the collar includes at least two key slots, each having a slot axis; and at least two jaw rods disposed in the bores and movable between a retracted jaw position and an extended jaw position, wherein the jaw rods include the jaw and a coupling member, with the coupling member being coupled to the slots for movement along the slot axes. Therefore, as the inner body moves from the extended inner body position to the retracted inner body position, the jaws move from the extended jaw position to the retracted jaw position to couple the workpiece to the chuck.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
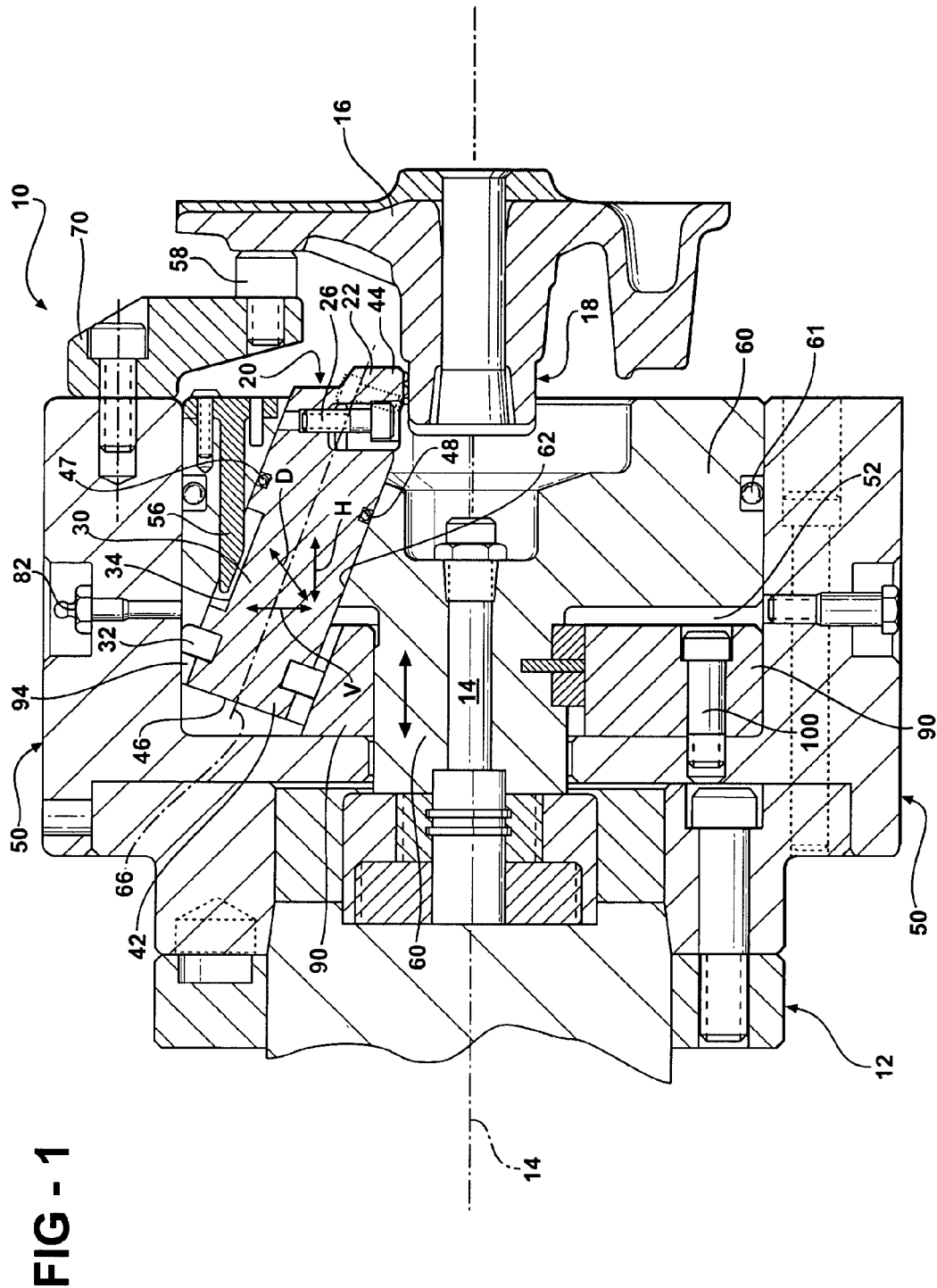
FIG. 1 is a sectional view of the chuck with the jaws gripping a workpiece in a retracted position.

FIG. 1 illustrates a chuck 10 for holding a workpiece 16. The chuck 10 is attached to a spindle 12 and generally includes an outer chuck body 50, an inner chuck body 60, jaw rods 30, collar 90, and a radial locator 56. The outer chuck body 50 locates the inner chuck body 60 for movement along the chuck axis 14. The inner chuck body 60 locates the jaw rods 30 for operational movement. The collar 90 is secured to the outer chuck body 50 and is operationally coupled to the jaw rods 30. As the inner chuck body 60 moves within the outer chuck body 50 between a retracted position for engaging a workpiece and an extended position for releasing a workpiece, the collar 90 is stationary along the chuck axis 14 within the outer chuck body 50. Even though the jaw rods 30 are coupled to the stationary collar 90, as the inner chuck body 60 moves between the extended and retracted positions, the jaw rods 30 move between a retracted position for engaging a workpiece and an extended position for releasing the workpiece. More specifically, the jaw rods 30, coupled to the collar 90, move both a radial distance relative to the chuck axis as well as along the chuck axis. To couple a workpiece 16 to the chuck 10, the workpiece is placed in operative alignment with the chuck axis 14. The inner chuck body 60 is then moved from an extended inner body position (FIG. 2) to a retracted inner body position (FIG. 1), during which the jaw rods 30 also move from an extended jaw position to a retracted position.

Figure 2:
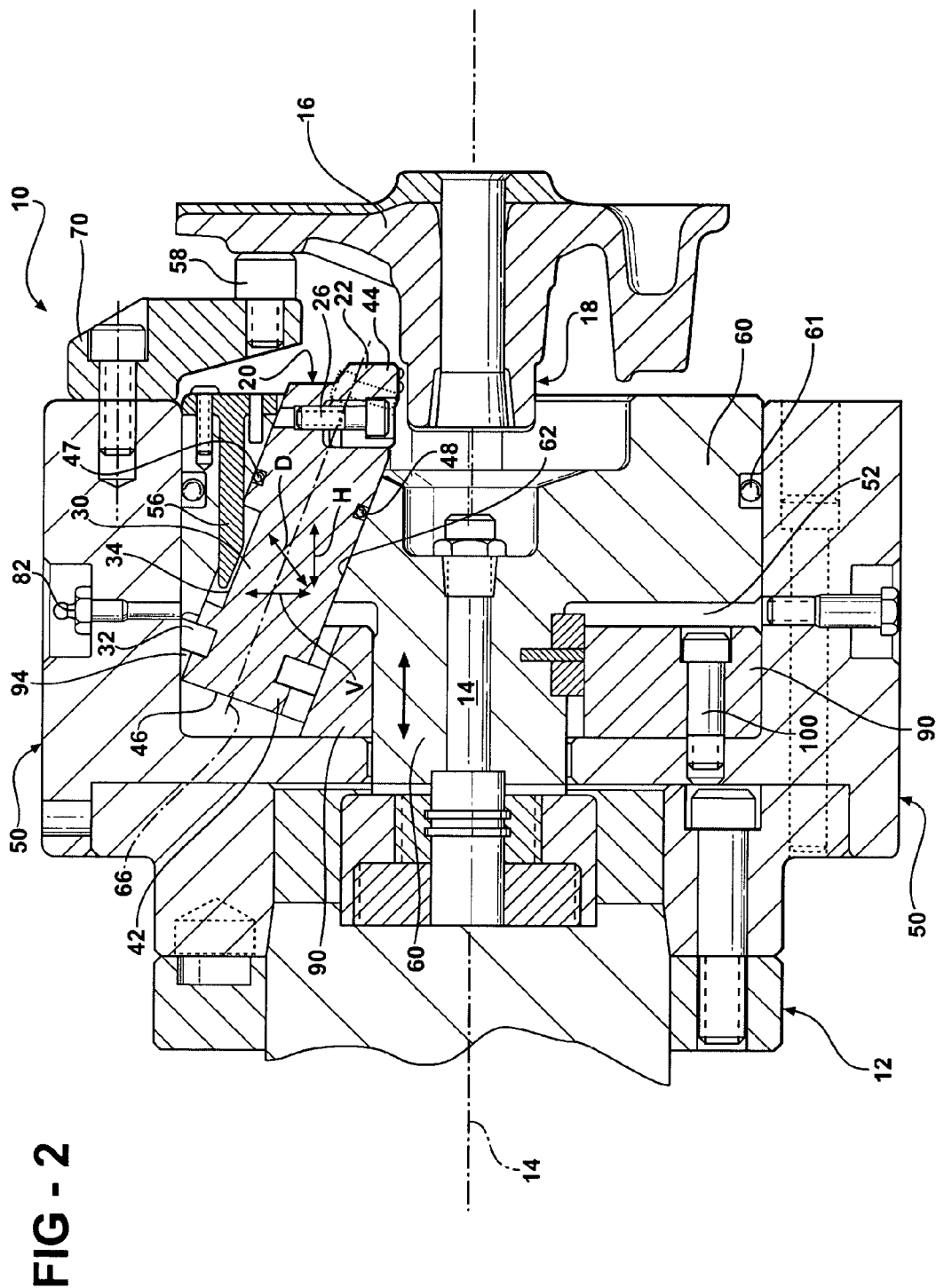
FIG. 2 is a sectional view of the chuck in an extended position.
Figure 3:
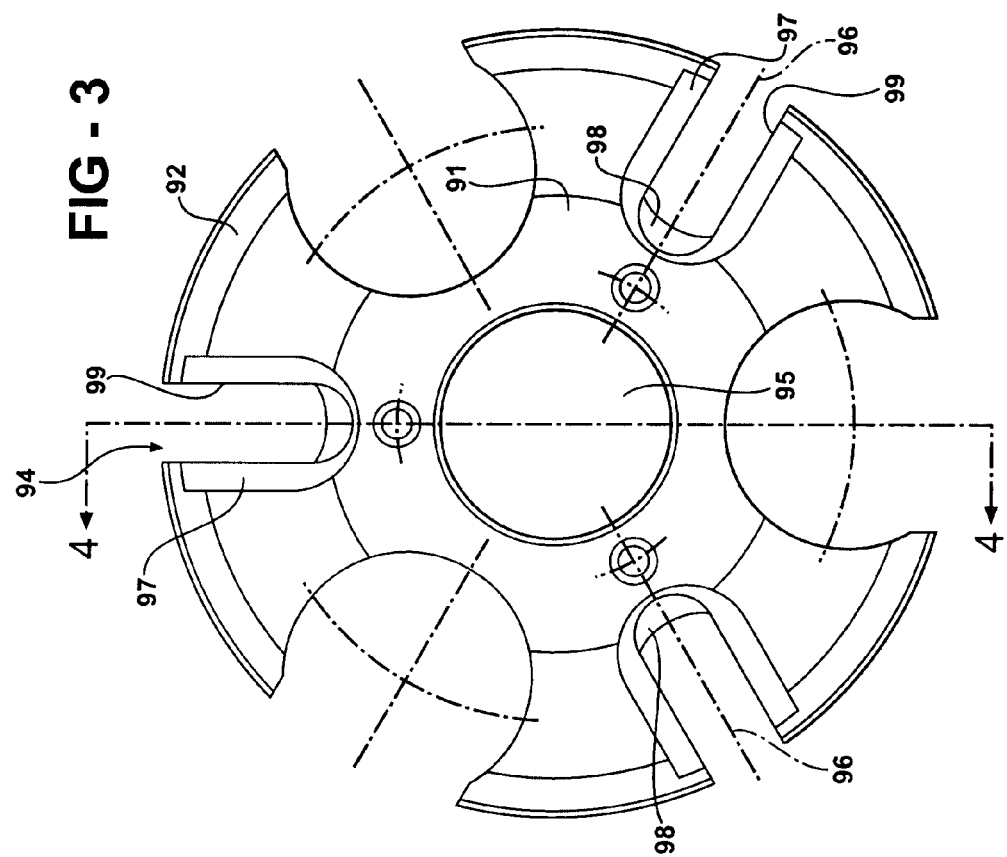
FIG. 3 is a top plan view of the collar.
Figure 5:
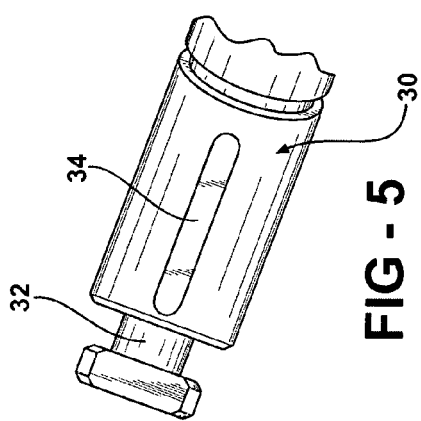
FIG. 5 is a perspective view of the jaw rod.
Figure 4:
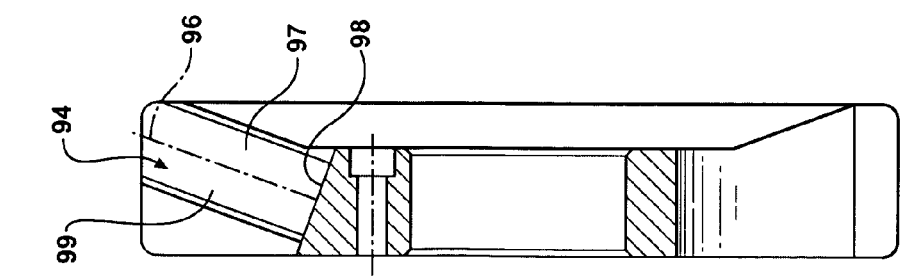
FIG. 4 is a sectional view of the collar along line 4—4 in FIG. 3.

The jaw rods 30 are best illustrated in FIGS. 1, 2 and 4 and each jaw rod generally includes a first end 44, a second end 46, a sealing recess 48, a radial locator groove 34, and jaws 22. The jaws 22 are attached to the first end 44 of the jaw rod 30. The jaws 22 may be made in a variety of sizes and shapes to engage different workpieces 16. For example, the jaws 22 may be formed with split ends to securely grip the outer radial surface 18 of the workpiece 16. The jaws 22 may also include replaceable jaw inserts and may be configured in a variety of sizes, shapes, and materials depending on the workpiece 16 to be gripped and the operations to be performed. As shown in FIG. 1, the jaws 22 may be releasably attached to the jaw rods 30 by a jaw attachment fastener 26, such as a bolt or pin. This allows the jaws 22 to be changed to allow for different operations, workpieces with various outer radial surface configurations, and/or workpieces with various diameters. The radial locator groove 34 establishes the angular or rotational position of the jaws 22 within the bores 62 and relative to workpiece 16 as described in greater detail below. Lubrication grooves or pockets (not shown)

may be included in the jaw rod 30 to facilitate the flow of lubrication to help ensure smooth movement of the jaw rod 30 within the inner chuck body 60. The sealing recesses 48 are shown to receive a seal 47 such as an O-ring to prevent dirt, dust, machine materials, and other contaminants from entering the lubricated portions of the chuck 10. Seals (not shown) may also be included between the outer chuck body 50 and inner chuck body 60 to prevent dirt, dust, and other contaminants from entering the chuck.

The second end 46 of the jaw rod 30 is generally coupled to the collar 90 for operational movement. The second end may include a radial recess 32 and a coupling member 42 to be operationally coupled to the collar as described in greater detail below. The jaw rods 30 are movable between a coupled position and a removable position by rotating the jaw rods about the bore axis 66 when the radial locator 56 is disengaged. More specifically, in the coupled position, the coupling member 42 is coupled to the collar 90. The radial locator 56 may engage the groove 34 in the coupled position to prevent movement about the bore axis 66. The size and shape of the jaw rods 30 may also depend on the application and size of the workpiece 16.

The outer chuck body 50 is configured to receive and operationally couple the jaw rods 30, inner chuck body 60, and collar 90 to the outer body 50 while allowing the inner chuck body 60 to move within the cavity 52 along the chuck axis 14. As illustrated in FIG. 1, the outer chuck body 50 generally includes a cavity 52 to receive the inner chuck body 60 and the collar 90. A collar attachment mechanism or fastener 100 (FIG. 1) attaches the collar to the outer chuck body 50 to restrain the collar from movement along the chuck axis 14. The cavity 52 and inner chuck body 60 may be made in a variety of shapes and sizes so long as the inner chuck body 60 may move along the chuck axis 14 between extended and retracted inner body positions. For example, the cavity 52 may be hexagonal in shape with the outer surface of the inner cavity having a matching hexagonal shape fitting within the cavity. In the illustrated embodiment, the cavity 52 and inner chuck body 60 are cylindrical in shape. Bearing assemblies facilitate smooth operation of the inner chuck body 60 along the chuck axis 14 within the cavity 52. A grease port 82 provides lubricant between the inner chuck body 60 and outer chuck body 50. The grease port 82 may be further configured to lubricate the slots 94 on the collar as well as the jaw rods 30 within the bores 62 on the inner chuck body 60. An O-ring 61 may be used to prevent contamination of the lubricated surfaces and for retention of the lubrication.

A workpiece rest 70 may be attached to the outer chuck body for locating a workpiece 16 along the chuck axis 14 relative to the outer chuck body 50. The rest 70 may further include locator pins 58 upon which the workpiece 16 rests. The radial rest pins 58 are configured to easily adjust for various workpieces 16.

The collar 90 is coupled to the outer chuck body 50 and includes a hollow central section 95 and hub 91. The hollow central section 95 allows the inner chuck body 60 or a member coupled to the inner chuck body, to extend through the collar 90 so that the inner chuck body 60 may be moved along the chuck axis 14 within the outer chuck body 50. The hub 91 extends from the hollow central section 95 and includes an outer radial surface 92 from which key slots 94 extend inwardly. The key slots 94 include a slot axis 96 and slot projections 97 to couple the jaw rods 30 as described in greater detail below. The jaw rods 30 typically move along the slot axis 96 as the inner chuck body 60 is moved between the extended and retracted inner body positions. More specifically, the slot projections 97 have a linear portion 99 along which the radial recess 32 and coupling member 42 slide. It should readily be recognized that the slot 94, slot projection 97, and radial recess 32 may be formed in a variety of sizes, shapes, and configurations while permitting controlled movement of the jaw rod 30 within the key slot 94. The inner periphery of the key slot 94 is generally circular as indicated at 98. In the illustrated embodiment, the jaw rod 30 moves away from the hollow central section 95 along the slot axis 96 as the inner chuck body 60 is extended along the chuck axis 14. Alternatively, the jaw rod 30 moves along the slot axis 96, approaching the hollow central section 95, as the inner chuck body 60 is retracted.

The inner chuck body 60 is configured to receive and align the jaw rods 30. As illustrated in FIG. 1, the inner chuck body 60 generally includes bores 62 to receive the jaw rods 30. The number of bores 62 defined by the inner chuck body 60 is dependent upon the application and number of jaws 22 desired to grip the workpiece 16.

The bores 62 are angled relative to the chuck axis 14 so that the jaws 22 approach the chuck axis as the inner chuck body 60 is retracted into the outer chuck body 50 allowing the jaws to securely engage the workpiece 16. The bores 62 include a bore axis 66 along which the jaw rods 30 are extended and retracted. The outer surface of the bores 62 support the jaw rods 30. The jaw rods 30, located within the bores 62, extend through the inner chuck body 60 into the cavity 52 defined by the outer chuck body 50. In the illustrated embodiment, the bore axis 66 of the inner chuck body 60 intersects the slot axis 96 in an approximately perpendicular arrangement to allow the jaw rods 30 to be extended and retracted as the inner chuck body moves between the extended and retracted positions.

The alignment of the slots 94 and bores 62 causes the jaw rods to move diagonally respective to the chuck axis 14. The diagonal movement is approximately equal to the movement of the jaw rod along the slot axis 96. Because the slot axis 96 is angled relative to the chuck axis 14, the slot axis includes a horizontal component along the chuck axis and a vertical component radially from the chuck axis. The jaw rods 30 move diagonally along the slot axis 96 shown by arrow D in FIG. 1, the jaw rod 30 therefore has a horizontal movement along arrow H, and a vertical movement along arrow V. Therefore, as the inner body 60 moves along the chuck axis 14, the jaw rods 30 slide in the slots 94, so that as the inner chuck body is moved from a retracted inner body position to an extended inner body position, the jaw rods move from a retracted jaw position to an extended jaw position.

During chuck operation, the jaw rods 30 are first placed in the extended jaw position as shown in FIG. 2, to permit loading of the workpiece 16 by moving the inner chuck body 60 to an extended inner body position. The workpiece 16 generally rests against the workpiece rest 70; specifically the locator pins 58 in the illustrated embodiment. The rest 70 limits movement of the workpiece 16 along the chuck axis 14 by establishing a seating surface.

With the workpiece properly positioned, the inner chuck body 60 is then moved from the extended inner body position toward the retracted inner body position. As the inner chuck body 60 moves from the extended inner body position to the retracted inner body position, the jaw rods 30 in the bores 62, restrained by the collar 90, move within the bores along the bore axis 66, relative to the inner chuck body 60. The radial locator 56 ensures that each jaw rod 30 remains aligned with the workpiece 16 and coupled to the collar 90. Also, as the inner chuck body 60 is moved from the extended to the retracted inner body position, the jaws 22 approach the chuck axis as the jaw rods 30 slide within the key slots 94 along the slot axis 96. The configuration of the collar 90 and arrangement of the slot axis 96 further causes the jaw rods 30 to move along the chuck axis 14 and to be retracted into the outer chuck body 50. Engagement of the coupling member 42 and slot 94 constrain movement of the jaw rods 30 along the slot axis 96, thereby constraining movement of the jaw rods 30 along the chuck axis and radially about the chuck axis which limits the jaw rods 30 in the distance they may move along the chuck axis as well as the distance they may move radially relative to the chuck axis. After the workpiece 16 is securely restrained by the chuck 10, the desired machining or other operation may be performed.

Upon completion of the machining operation, the workpiece 16 is released from the chuck 10 by moving the jaw rods 30 from the retracted to the extended jaw position. More specifically, the inner chuck body 60 is moved from the retracted to the extended inner body position, allowing the jaw rods 30 to move diagonally relative to the chuck axis 14, extending outwardly from the outer chuck body 50, as well as radially away from the chuck axis, thereby disengaging the outer radial surface 18 of the workpiece 16. Once the jaw rods 30 are disengaged from the workpiece 16, the workpiece may be removed from the chuck 10.

Even though the chuck 10 as described above and illustrated in FIGS. 1–5 has been primarily described with the jaws 22 engaging the outer surface 18 of a workpiece 16, it should be readily apparent to one skilled in the art that the chuck 10 with minor modifications may be used to grip the inner diameter of a workpiece. The modifications may include orienting the bores 62 to be angled away from the chuck axis 14 (as opposed to toward the chuck axis as shown in the drawings) and changing the orientation of the slot axis to remain approximately perpendicular to the new bore axis.

The collar 90 being coupled to outer chuck body 50 and the jaw rods 30 being coupled to the collar limits the movement and force that may be applied by the chuck 10 to prevent damage to the workpiece 16. The unique arrangement of the slot axis 96, being angled relative to the chuck axis 14 and being approximately perpendicular to the bore axis 66, limits the movement of the jaws 22 along the chuck axis as well as the distance of movement away from or toward the chuck axis.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A chuck for holding a workpiece comprising:
   an outer chuck body having a chuck axis and defining a cavity;
   a collar coupled to said outer chuck body and including a slot having a slot axis angled relative to said chuck axis;
   an inner chuck body located within said cavity and movable along said chuck axis relative to said collar and outer chuck body, said inner chuck body including a bore having a bore axis angled relative to said chuck axis; and
   a jaw rod disposed in said bore and coupled to said collar, wherein as said inner chuck body moves along said chuck axis, said jaw rod moves diagonally relative to said chuck axis, said diagonal movement including a horizontal component generally parallel to said chuck axis and a vertical component generally perpendicular to said chuck axis.

2. The chuck of claim 1 wherein said jaw rod further includes a first end having a jaw, and a second end, wherein said second end is coupled to said collar.

3. The chuck of claim 2 wherein said jaw rod includes a second end having a radial recess and a coupling member, and wherein said slot defines an opening having a width, said radial recess having a diameter less than said width and said coupling member having a maximum diameter greater than said width.

4. A chuck for holding a workpiece comprising:
   an outer chuck body having a chuck axis and defining a cavity;
   a collar coupled to said outer chuck body and including a slot having a slot axis angled relative to said chuck axis, said slot defining an opening having a width;
   an inner chuck body located within said cavity and movable along said chuck axis relative to said collar and said outer chuck body, said inner chuck body including a bore having a bore axis angled relative to said chuck axis;
   a jaw rod coupled to said collar, said jaw rod being disposed in said bore and movable between a coupled position and a release position, said jaw rod further including a first end having a jaw, a second end coupled to said collar, and a groove, said second end having a radial recess and a coupling member and wherein said radial recess has a diameter less than said width and said coupling member has a maximum diameter greater than said width; and
   a radial locator engaging said groove in said coupled position and wherein said coupling member is coupled to said collar in said coupled position.

5. A chuck for holding a workpiece comprising:
   an outer chuck body having a chuck axis and defining a cavity;
   a collar coupled to said outer chuck body and including a slot having a slot axis angled relative to said chuck axis;
   an inner chuck body located within said cavity and movable along said chuck axis relative to said collar and outer chuck body, said inner chuck body including a bore having a bore axis angled relative to said chuck axis;
   a jaw rod disposed in said bore and coupled to said collar, said jaw rod further including a groove, a first end having a jaw and a second end coupled to said collar; and
   a radial locator engaging said groove to limit rotation of said jaw relative to said bore axis.

6. The chuck of claim 1 wherein said bore axis is approximately perpendicular to said slot axis.

7. The chuck of claim 5 wherein said jaw rod moves a distance along said slot axis, said diagonal movement being approximately equal to said slot axis distance.

8. The chuck claim 1 wherein said collar is restrained from movement along said chuck axis.

9. A chuck and a workpiece assembly comprising:
   a workpiece;
   a chuck having jaws coupling said workpiece to said chuck, said chuck including:
   an outer body having a cavity and a chuck axis;
   an inner body having at least two bores each having a bore axis angled relative each other, said inner body movable between an extended inner body position and a retracted inner body position along said chuck axis and within said cavity;

a collar positioned between said outer body and said inner body, said collar including at least two key slots, each having a slot axis;

at least two jaw rods disposed in said bores and movable between a retracted jaw position and an extended jaw position, said jaw rods including said jaw and a coupling member, said coupling members being coupled to said slots for movement along said slot axes;

wherein as said inner body moves from said extended inner body position to said retracted inner body position, said jaws move diagonally relative to said chuck axis from said extended jaw position to said retracted jaw position to couple said workpiece to said chuck, said diagonal movement including a horizontal component generally parallel to said chuck axis and a vertical component generally perpendicular to said chuck axis.

10. The assembly of claim 9 wherein said collar is restrained from movement along said chuck axis as said inner body is moved from one of said extended and retracted inner body positions to the other of said extended and retracted inner body positions.

11. The assembly of claim 9 wherein each of said bore axes are approximately perpendicular to one of said slot axes.

12. The assembly of claim 9 wherein said chuck further includes a radial locator and said jaw rod includes a groove, said radial locator engaging said groove to rotationally position said jaws relative to said bore axis.

13. The chuck of claim 3 wherein said jaw rod moves between a coupled position and a release position, and wherein a radial locator engages a groove in said coupled position and said coupling member being coupled to said collar in said coupled position.

14. The chuck of claim 2 further including a radial locator and wherein said jaw rod further includes a groove, said radial locator engaging said groove to limit rotation of said jaw relative to said bore axis.

15. The chuck of claim 4 wherein as said inner chuck body moves along said chuck axis, said jaw rod moves diagonally relative to said chuck axis, said diagonal movement including a horizontal component generally parallel to said chuck axis and a vertical component generally perpendicular to said chuck axis.

16. The chuck of claim 5 wherein as said inner chuck body moves along said chuck axis, said jaw rod moves diagonally relative to said chuck axis, said diagonal movement including a horizontal component generally parallel to said chuck axis and a vertical component generally perpendicular to said chuck axis.

17. The chuck of claim 16 wherein said jaw rod moves a distance along said slot axis, said diagonal movement being approximately equal to said slot axis distance.

18. The chuck of claim 4 wherein said bore axis is approximately perpendicular to said slot axis.

19. The chuck of claim 5 wherein said bore axis is approximately perpendicular to said slot axis.

* * * * *

UNITED STATES PATENT AND TRADEMARK OFFICE
CERTIFICATE OF CORRECTION

PATENT NO. : 6,953,198 B2  Page 1 of 1
DATED : October 11, 2005
INVENTOR(S) : Edmund J. Onyszkiewicz et al.

It is certified that error appears in the above-identified patent and that said Letters Patent is hereby corrected as shown below:

Column 6,
Line 57, before "claim" insert -- of --.

Signed and Sealed this

Sixth Day of December, 2005

JON W. DUDAS
*Director of the United States Patent and Trademark Office*